(12) United States Patent
Yoon

(10) Patent No.: US 12,376,014 B2
(45) Date of Patent: Jul. 29, 2025

(54) APPARATUS AND METHOD FOR FREQUENCY SCAN CONTROL IN SLEEP MODE OF VEHICLE

(71) Applicant: HYUNDAI MOBIS CO., LTD., Seoul (KR)

(72) Inventor: Yi Ha Yoon, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 403 days.

(21) Appl. No.: 17/809,522

(22) Filed: Jun. 28, 2022

(65) Prior Publication Data
US 2022/0417836 A1    Dec. 29, 2022

(30) Foreign Application Priority Data
Jun. 28, 2021    (KR) .......... 10-2021-0084216

(51) Int. Cl.
*H04W 48/16*    (2009.01)
*H04W 4/44*    (2018.01)

(52) U.S. Cl.
CPC .......... *H04W 48/16* (2013.01); *H04W 4/44* (2018.02)

(58) Field of Classification Search
CPC ... H04W 48/16; H04W 4/44; H04W 52/0254; H04W 84/005; H04W 52/0251; H04W 4/40; H04W 8/02; Y02D 30/70
See application file for complete search history.

(56) References Cited

U.S. PATENT DOCUMENTS

2007/0207841 A1*  9/2007  Amerga .............. H04W 52/287
                                                         455/574

FOREIGN PATENT DOCUMENTS

| EP | 2 510 727 | 1/2014 | |
|----|-----------|--------|---|
| EP | 3 076 715 | 10/2016 | |
| KR | 2019-0095071 | 8/2019 | |
| WO | WO 2011/071751 | 6/2011 | |
| WO | WO-2020110838 A1 * | 6/2020 | ............. H04W 4/44 |

* cited by examiner

*Primary Examiner* — Anthony S Addy
*Assistant Examiner* — Jason Utley
(74) *Attorney, Agent, or Firm* — DLA Piper LLP US

(57) ABSTRACT

An apparatus for controlling frequency scanning in a sleep mode of a vehicle and a method thereof. The apparatus includes an input unit configured to receive vehicle mode information, a memory configured to store a program controlling the frequency scanning according to the vehicle mode information, and a processor configured to execute the program, and the processor stops the frequency scanning when the vehicle mode information is the sleep mode.

6 Claims, 4 Drawing Sheets

APPARATUS AND METHOD FOR FREQUENCY SCAN CONTROL IN SLEEP MODE OF VEHICLE

CROSS-REFERENCE TO RELATED APPLICATION

This application claims priority to and the benefit of Korean Patent Application No. 10-2021-0084216, filed on Jun. 28, 2021, the disclosure of which is incorporated herein by reference in its entirety.

BACKGROUND

Field of the Invention

The present invention relates to an apparatus for controlling a frequency scanning in a sleep mode of a vehicle and a method thereof.

Discussion of Related Art

For mobile communication networks and systems, detailed description can be found in technical specifications published by standardization organizations such as the third-generation partnership project (3GPP) in particular.

As the number of radio access technology (RAT, communication method for each generation) increases, the number of supporting bands increases, and thus a range of a home public land mobile network (HPLMN) scanning also increases.

For this reason, when the HPLMN scanning is performed, it is basically necessary to scan for each band supported by GSM/UMTS/LTE.

However, although this method is basically suitable for a mobile phone having mobility, in case of a car, since mobility is lost in a certain situation (e.g., when an engine is turned off), there is a problem that this method is not suitable to be applied as is.

SUMMARY OF THE INVENTION

The present invention is directed to solving the above problems, and an object of the present invention is to provide an apparatus for controlling a frequency scanning in a sleep mode of a vehicle and a method thereof capable of preventing battery discharge and extending battery life by modifying communication standards according to a characteristic of a connected car for a situation in which there is temporarily no mobility and removing unnecessary frequency scanning operations.

An apparatus for controlling a frequency scanning in a sleep mode of a vehicle according to the present invention includes an input unit configured to receive vehicle mode information, a memory configured to store a program controlling the frequency scanning according to the vehicle mode information, and a processor configured to execute the program, and the processor stops the frequency scanning when the vehicle mode information is the sleep mode.

A method of controlling a frequency scanning in a sleep mode of a vehicle according to the present invention includes (a) detecting a movement in a roaming area, (b) performing the frequency scanning according to the movement in the roaming area, and (c) controlling a scanning timer and a scanning operation depending on whether or not the vehicle is in the sleep mode.

According to an exemplary embodiment of the present invention, it is possible to minimize a battery discharge issue and extend battery life by removing unnecessary frequency scanning operations in consideration of a characteristic of an immobile vehicle during sleep.

Effects of the present invention are not limited to those mentioned above, and other effects not mentioned will be clearly understood by those of ordinary skill in the art from the following description.

DETAILED DESCRIPTION OF EXEMPLARY EMBODIMENTS

The aforementioned object and other objects, advantages and features of the present invention and methods for achieving them will be made clear from exemplary embodiments described in detail below with reference to the accompanying drawings.

However, the present invention may be embodied in many different forms and should not be construed as being limited to the embodiments set forth herein. Rather, these embodiments are provided so that this disclosure will be thorough and complete and will fully convey the object, structure and effects of the present invention to those of ordinary skill in the technical field to which the present invention pertains. The present invention is defined by the claims.

Meanwhile, terms used herein are for the purpose of describing the exemplary embodiments and are not intended to limit the present invention. As used herein, the singular forms include the plural forms as well unless the context clearly indicates otherwise. The term "comprises" and/or "comprising" used herein does not preclude the presence or addition of one or more other elements, steps, operations, and/or devices other than stated elements, steps, operations, and/or devices.

Hereinafter, in order to facilitate the understanding of those of ordinary skill in the art, the background to which the present invention is proposed will be first described, and then, exemplary embodiments of the present invention will be described.

A home public land mobile network (HPLMN) is a telecommunication service company to which a user is subscribed.

A modem using 3GPP standards (GSM, UMTS, LTE, 5G) performs periodic HPLMN searches during roaming.

This process is performed to return to the HPLMN with guaranteed quality of service, and the modem operates an HPLMN scanning timer and performs a frequency scanning for each band to return to the HPLMN when the timer expires.

As described above, although a method according to a related art is suitable for a mobile phone having mobility, there is a problem that the method is not suitable to be applied as is to a vehicle in which mobility is lost in a certain situation (e.g., when an engine is turned off).

Figure 1:
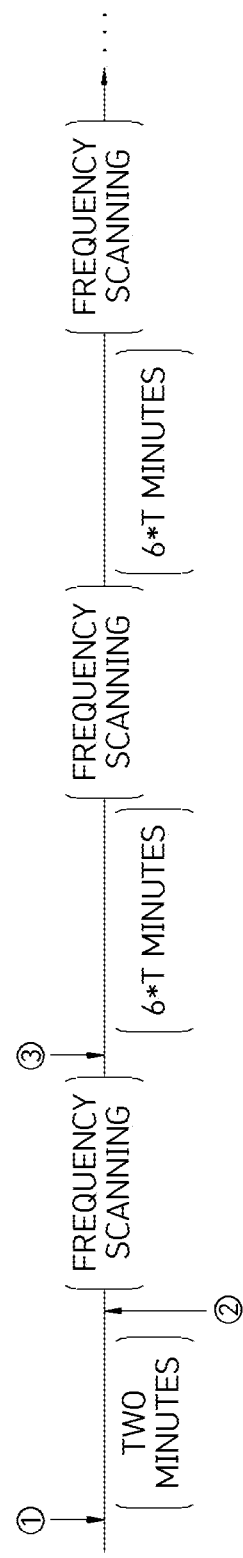
FIG. 1 shows a frequency scanning process according to a related art.

FIG. 1 shows a frequency scanning process according to a related art.

When a vehicle enters a roaming area (①), a frequency scanning is performed after first two minutes (②).

Thereafter, a frequency scanning is performed after a specific time (6*T minutes) stored in a Subscriber Identity Module (SIM) (③).

This frequency scanning process is repeated continuously until returning to an HPLMN.

The present invention is directed to solving the above problems, and providing an apparatus for controlling a frequency scanning in a sleep mode of a vehicle and a method thereof capable of minimizing a battery discharge issue and extending battery life by removing unnecessary frequency scanning operations in consideration of a characteristic of a vehicle during sleep without mobility (engine on→engine off).

Figure 2:
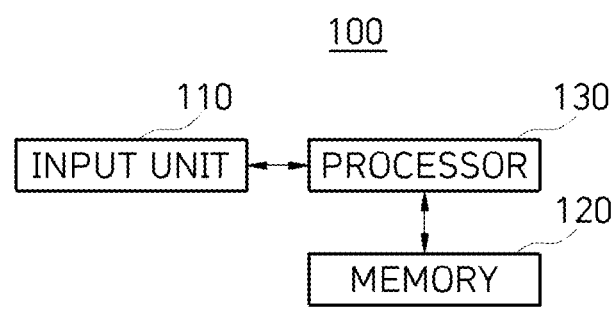
FIG. 2 shows an apparatus for controlling a frequency scanning in a sleep mode of a vehicle according to an exemplary embodiment of the present invention.

FIG. 2 shows an apparatus for controlling a frequency scanning in a sleep mode of a vehicle according to an exemplary embodiment of the present invention.

The apparatus 100 for controlling the frequency scanning in the sleep mode of the vehicle according to the present invention distinctively includes an input unit 110 configured to receive vehicle mode information, a memory 120 configured to store a program for controlling the frequency scanning according to the vehicle mode information, and a processor 130 configured to execute the program, and the processor 130 stops the frequency scanning when the vehicle mode information is the sleep mode.

The input unit 110 receives the vehicle mode information when the vehicle is moving in a roaming area.

When an engine is turned off, the processor 130 confirms that the vehicle is in the sleep mode and stops an HPLMN scanning timer.

When the engine is turned on, the processor 130 confirms the end of the sleep mode and resumes the HPLMN scanning timer.

Figure 3:
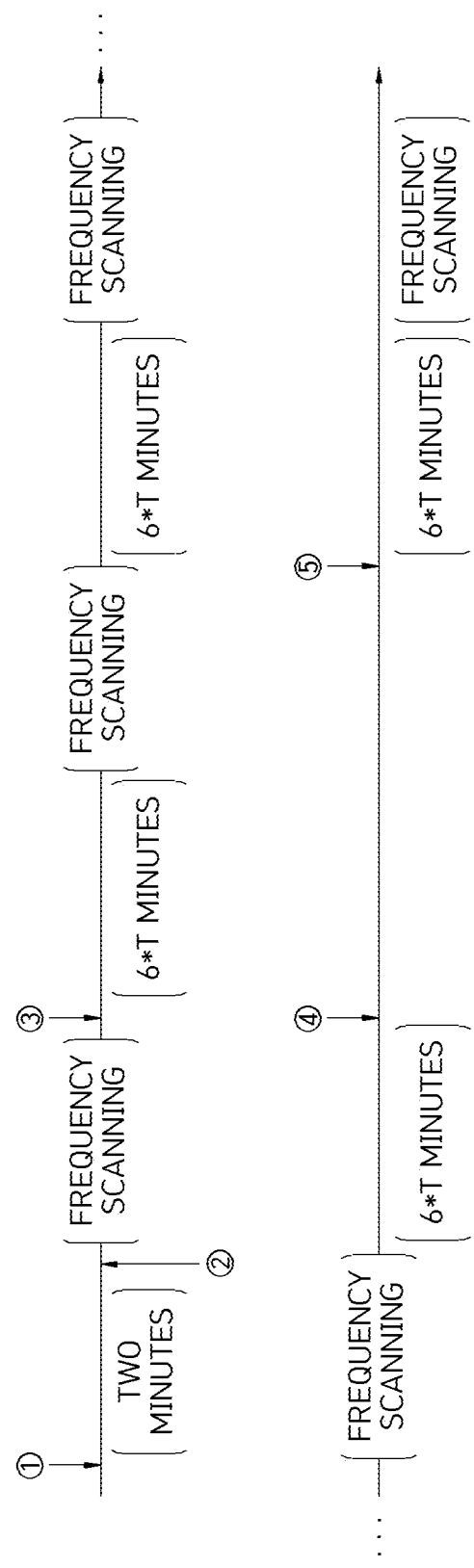
FIG. 3 shows a frequency scanning process according to an exemplary embodiment of the present invention.

FIG. 3 shows a frequency scanning process according to an exemplary embodiment of the present invention.

When a vehicle enters a roaming area (①), a frequency scanning is performed after first two minutes (②).

Thereafter, the frequency scanning is performed after a specific time (6*T minutes) stored in an SIM (③), and this frequency scanning process is repeated continuously until returning to an HPLMN.

According to an exemplary embodiment of the present invention, an HPLMN scanning timer is suspended (④) when the vehicle is in the sleep mode, in other words, when an engine is turned off.

Subsequently, when the vehicle sleep mode ends, in other words, when the engine is turned on, the HPLMN scan timer is resumed, and the frequency scanning is performed after a preset time (6*T minutes) (⑤).

A method of controlling a frequency scanning in a vehicle sleep mode according to the present invention includes operations of (a) detecting a movement in a roaming area, (b) performing the frequency scanning according to the movement in the roaming area, and (c) controlling a scanning timer and a scanning operation depending on whether or not the vehicle is in the sleep mode.

In operation (b), the frequency scanning is performed based on time information stored in an SIM, and the time information is adjusted according to a counting value of an HPLMN regression attempt.

For example, the frequency scanning is attempted according to the time information (6*T minutes) stored in the SIM, and this frequency scanning is repeated continuously until returning to the HPLMN.

In operation (b), it is possible to perform a count of the attempts of the frequency scanning for regression until the HPLMN regression, and adjust the period of the frequency scanning by adjusting the time information described above according to the counting value.

In operation (c), when it is confirmed that the vehicle is in the sleep mode as an engine is turned off (off), an HPLMN scanning timer is stopped (suspended), and when the engine is turned on (on), the end of the vehicle sleep mode is confirmed, and the HPLMN scanning timer is resumed.

Figure 4:
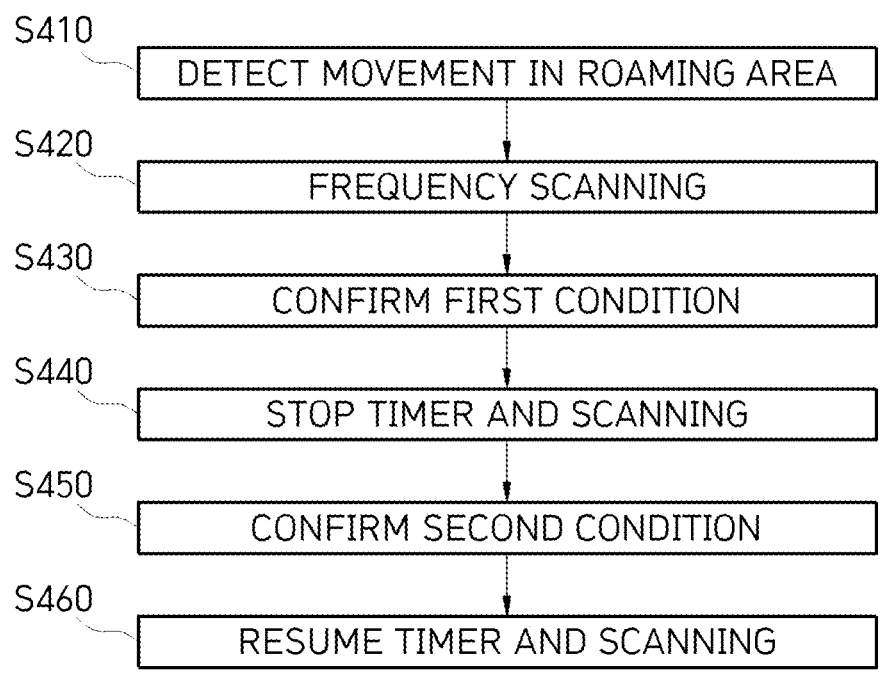
FIG. 4 shows a method of controlling a frequency scanning in a sleep mode of a vehicle according to an exemplary embodiment of the present invention.

FIG. 4 shows a method of controlling a frequency scanning in a sleep mode of a vehicle according to an exemplary embodiment of the present invention.

In operation S410, it is detected whether the vehicle moves and enters a roaming area.

In operation S420, when the vehicle enters the roaming area in operation S410, a frequency scanning is performed after the first two minutes, and the frequency scanning is performed after a specific time (6*T minutes) stored in an SIM.

In operation S430, it is confirmed whether a first condition which means the vehicle sleep mode is satisfied by turning off an engine.

When the vehicle sleep mode is confirmed in operation S430, in operation S440, an HPLMN scanning timer is stopped and then the frequency scanning is stopped.

In operation S450, it is confirmed whether a second condition which means the end of the vehicle sleep mode is satisfied by turning on the engine.

When the end of the vehicle sleep mode is confirmed in operation S450, in operation S460, the HPLMN scanning timer is resumed and then the frequency scanning is resumed.

Meanwhile, a method of controlling a frequency scanning in a sleep mode of a vehicle according to an exemplary embodiment of the present invention may be implemented in a computer system or recorded in a recording medium. The computer system may include at least one processor, a memory, a user input device, a data communication bus, a user output device, and a storage. Each of the aforementioned components performs data communication through the data communication bus.

The computer system may further include a network interface coupled to a network. The processor may be a central processing unit (CPU) or a semiconductor device that processes instructions stored in the memory and/or the storage.

The memory and storage may include various types of volatile or non-volatile storage media. For example, the memory may include ROM and RAM.

Accordingly, the method of controlling the frequency scanning in the sleep mode of the vehicle according to an exemplary embodiment of the present invention may be implemented as a computer-executable method. When the method of controlling the frequency scanning in the sleep mode of the vehicle according to an exemplary embodiment of the present invention is performed in a computer device, computer readable instructions may perform the method of controlling the frequency scanning according to the present invention.

Meanwhile, the method of controlling the frequency scanning in the sleep mode of the vehicle according to the present invention described above may be implemented as a computer readable code on a computer readable recording medium. The computer-readable recording medium includes any type of recording medium in which data that can be decoded by a computer system is stored. For example, there may be a read only memory (ROM), a random access memory (RAM), a magnetic tape, a magnetic disk, a flash memory, an optical data storage device, etc. In addition, the computer-readable recording medium may be distributed in the computer system connected through a computer communication network, and stored and executed as readable codes in a distributed manner.

So far, the exemplary embodiments of the present invention have been mainly looked at. Those of ordinary skill in the technical field to which the present invention pertains should be able to understand that various modifications and alterations can be made without departing from the technical spirit or essential features of the present invention. Therefore, it should be understood that the disclosed embodiments are not limiting but illustrative in all aspects. The scope of the present invention is defined not by the above description but by the following claims, and it should be understood that all changes or modifications derived from the scope and equivalents of the claims fall within the scope of the present invention.

What is claimed is:

1. An apparatus for controlling frequency scanning in a sleep mode of a vehicle, the apparatus comprising:
    a computer system configured to receive vehicle mode information;
    a memory configured to store a program controlling the frequency scanning according to the vehicle mode information;
    and a processor configured to execute the program, wherein the processor stops the frequency scanning when the vehicle mode information is the sleep mode; and wherein the processor confirms that the vehicle is in the sleep mode when an engine is turned off, and stops a home public land mobile network (HPLMN) scanning timer.

2. The apparatus of claim 1, wherein the computer system receives the vehicle mode information when the vehicle is moving in a roaming area.

3. The apparatus of claim 1, wherein the processor confirms an end of the sleep mode when the engine is turned on, and resumes the HPLMN scanning timer.

4. A method of controlling frequency scanning in a sleep mode of a vehicle, the method comprising:
    (a) detecting movement in a roaming area;
    (b) performing the frequency scanning according to the movement in the roaming area; and
    (c) controlling a scanning timer and a scanning operation based on whether or not the vehicle is in the sleep mode;
    wherein, in controlling the scanning timer and a scanning operation based on whether or not the vehicle is in the sleep mode, a home public land mobile network (HPLMN) scanning timer is stopped when it is confirmed that the vehicle is in the sleep mode as an engine is turned off.

5. The method of claim 4, wherein, in performing the frequency scanning according to the movement in the roaming area, the frequency scanning is performed based on time information stored in a Subscriber Identity Module (SIM), and the time information is adjusted according to a counting value of a home public land mobile network (HPLMN) regression attempt.

6. The method of claim 4, wherein, when the engine is turned on, the HPLMN scanning timer is resumed after confirming an end of the vehicle sleep mode.

* * * * *